United States Patent [19]

Heideman

[11] Patent Number: 4,690,255

[45] Date of Patent: Sep. 1, 1987

[54] COMPACT SHOCK ABSORBER

[75] Inventor: Robert J. Heideman, Westland, Mich.

[73] Assignee: Enertrols, Inc., Westland, Mich.

[21] Appl. No.: 838,267

[22] Filed: Mar. 10, 1986

[51] Int. Cl.$^4$ ............................................. F16F 9/44
[52] U.S. Cl. ................................................. 188/287
[58] Field of Search ............. 188/285, 287, 299, 315, 188/322.19

[56] References Cited

U.S. PATENT DOCUMENTS

| | | | |
|---|---|---|---|
| 3,344,894 | 10/1967 | Kenworthy | 188/287 |
| 3,840,097 | 10/1974 | Holley | 188/287 |
| 4,044,865 | 8/1977 | Tourunen | 188/287 |
| 4,174,098 | 11/1979 | Baker et al. | 188/287 X |
| 4,298,101 | 11/1981 | Dressell et al. | 188/287 X |

Primary Examiner—Duane A. Reger
Attorney, Agent, or Firm—Krass & Young

[57] ABSTRACT

A shock absorber including an inner tube closed at its rearward end and open at its forward end and having a plurality of ports formed at longitudinally spaced locations along its side wall, a piston rod and piston head assembly slidably received in the inner tube with the rearward end of the piston head spaced from the closed rearward end of the inner tube and the piston rod projecting forwardly out of the open forward end of the inner tube for impact by a moving object, an outer tube comprising the outer casing of the shock absorber and surrounding the inner tube, a plurality of longitudinally spaced interior grooves in the outer tube respectively registering with the ports in the inner tube and skewed with respect to the longitudinal axis of the shock absorber, and an annular accumulator chamber defined forwardly of the inner tube between the inner periphery of the outer tube and the outer periphery of the piston rod. A pair of longitudinally extending flats are provided at diametrically spaced locations on the exterior surface of the inner tube and these flats coact with the adjacent inner periphery of the outer tube to define a pair of longitudinal passages for routing the cushioning fluid from the interior grooves of the outer tube axially forwardly to the accumulator chamber so as to complete the closed fluid loop within the shock absorber.

13 Claims, 5 Drawing Figures

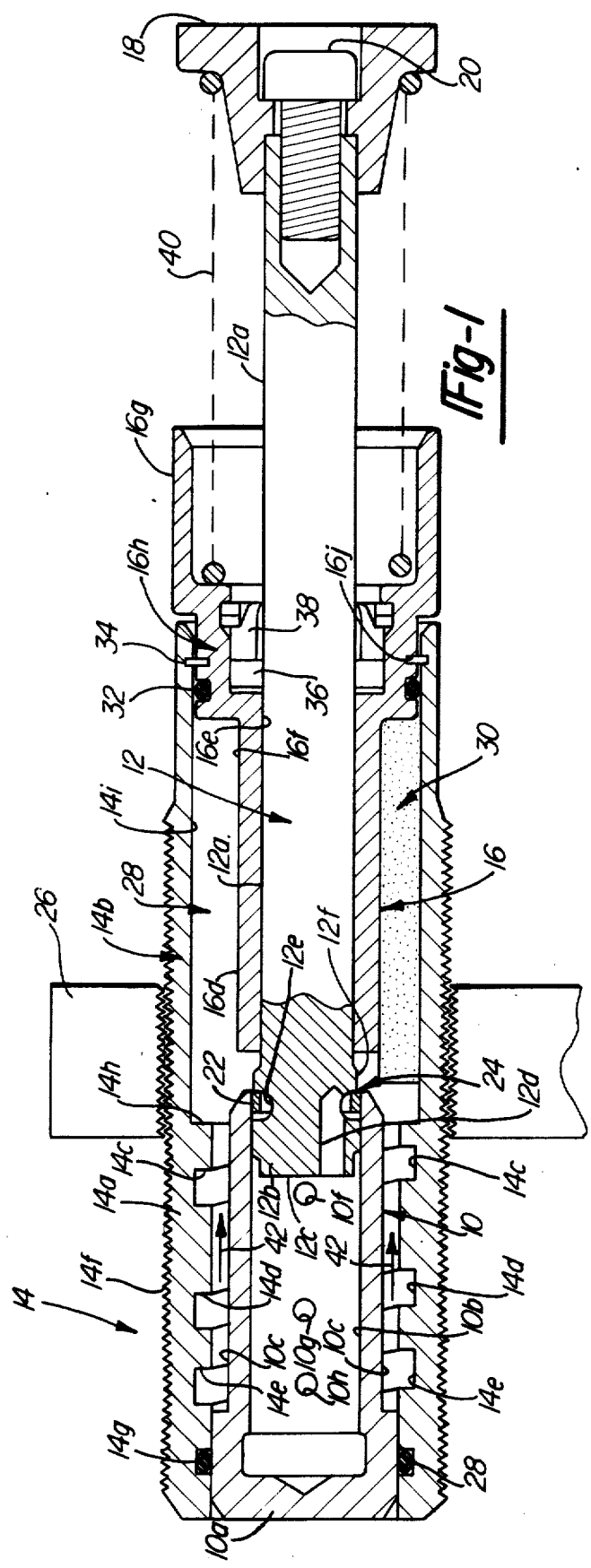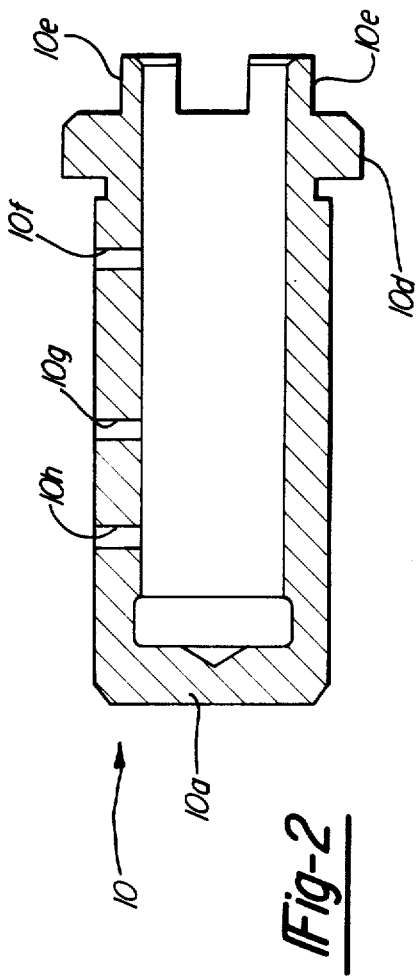

COMPACT SHOCK ABSORBER

BACKGROUND OF THE INVENTION

This invention relates to shock absorbers and more particularly to a shock absorber providing superior shock absorbing characteristics in an extremely compact package.

Shock absorbers which force fluid through a restricted orifice to convert the kinetic energy of a moving part into an increase of thermal energy of the fluid are commonly used on machines. The smoothest deceleration of the moving parts is obtained by absorbers which offer a constant resistive force to the motion over the total length of the deceleration.

One class of such devices employs a piston connected to the machine part and movable within a metering cylinder or tube having a closed end. A series of exponentially spaced orifices are formed along the length of the tube wall and the tube is supported within a housing filled with fluid. As the piston is forced into the tube by the motion of the machine part, the fluid is forced through the orifices and the kinetic energy of the part is converted into thermal energy of the fluid. As the piston moves down the metering tube it succcessively closes off the orifices so that the force imposed on the load is maintained relatively constant resulting in a substantially linear deceleration of the moving part.

The force imparted on the part is a function of the effective configuration of the fluid orifices, and shock absorbers of this class have been designed wherein an outer tube or sleeve fits over the inner, metering tube and is provided with metering means which coact with the metering orifices in the inner tube to vary the resistive force in response to relative movement between the tubes, thereby allowing the shock absorber to be selectively adjusted for use with parts having varying weights and kinetic energy.

Whereas these prior art shock absorbers have provided the desired substantially constant resistive force to the motion over the total period of the deceleration and have provided the desired ability to vary the resistance to accommodate parts having varying weights and kinetic energy, the prior art devices have offered this performance and adjustability at the expense of a rather large total package, which has had a limiting effect with respect to the usability of the shock absorbers in certain environments where space and/or weight are critical.

SUMMARY OF THE INVENTION

The present invention is directed to a shock absorber which offers superior shock absorbing performance and a wide range of adjustability and which may be packaged in a relatively narrow profile and in a relatively small weight package.

The shock absorber of the invention is of the type including an inner tube or cylinder closed at its rearward end and open at its forward end; a piston rod and piston head assembly slidably received in the inner tube with the rearward end of the piston head spaced from the closed rearward end of the inner tube and the piston rod projecting forwardly out of the open forward end of the inner tube for impact by a moving object; an outer tube or sleeve fitted over the inner tube; means in the inner and outer tubes cooperating to define a plurality of metering orifices; and adjusting means for providing relative movement between the tubes to selectively vary the size of the metering orifices and thereby selectively vary the impact resistance generated by movement of the cushioning fluid through the orifices in response to impacting movement of the piston assembly toward the closed, rearward end of the inner tube.

According to the invention, an annular accumulator chamber is provided in the shock absorber radially outwardly of the piston assembly at a longitudinal location forwardly of the metering orifices and means are provided for routing the cushioning fluid from the orifices axially forwardly between the tubes to the annular chamber. This basic arrangement retains the superior decelerating performance of the shock absorber and the desired adjustability of the shock absorber while substantially reducing the overall diameter and bulk of the shock absorber.

According to a further feature of the invention, the outer tube comprises the outer casing of the shock absorber and extends to a location forwardly of the inner tube, and the accumulator chamber is defined forwardly of the inner tube between the outer tube and the piston assembly. The outer tube thus performs the dual function of assisting in the adjustable metering of the fluid and also providing the outer casing of the shock absorber.

According to a further feature of the invention, the cooperating means in the tubes defining the metering orifices comprise a plurality of ports in the inner tube at longitudinally spaced locations along the side wall of the inner tube and a plurality of longitudinally spaced interior grooves in the outer tube respectively registering with the ports in the side wall of the inner tube and skewed with respect to the longitudinal axis of the shock absorber; and the adjusting means comprises means providing relative rotation between the tubes to skewingly move the grooves relative to the respective ports and thereby selectively vary the magnitude of the registration between the ports and the grooves.

According to a further feature of the invention, the means for routing the fluid forwardly into the accumulator chamber comprises at least one longitudinal passage defined between the tubes and extending forwardly from a location adjacent the rearmost metering orifice to the accumulator chamber.

In the disclosed embodiment of the invention, the longitudinal passage is formed in part by a longitudinally extending flat formed on the outer surface of the inner tube. The flat coacts with the confronting inner surface of the outer tube to define the routing passage and provides a convenient and compact means of closing the fluid loop within the shock absorber.

According to a further feature of the invention, the adjusting means includes an adjuster member extending into the open forward end of the outer tube and engaging at its rearward end with the forward end of the inner tube and presenting an adjustment knob at its forward end positioned forwardly of the forward end of the outer tube. This arrangement provides the desired adjustability feature and retains the overall diameter of the shock within the dimensions of the outer tube.

In the disclosed embodiment of the invention, the adjustment member is annular, the adjustment knob is defined by the forward annular portion of the adjustment member, and the adjustment member further defines an annular bearing portion between its rearward end and the adjustment knob journalling the piston rod at its inner periphery and coacting at its outer periphery with the confronting inner periphery of the outer tube to define the annular accumulator chamber. This arrangement allows the outer tube to function to assist in the definition of the adjustable metering orifices; to provide the outer casing of the shock absorber; and to define the outer boundary of the annular accumulator chamber.

BRIEF DESCRIPTION OF THE DRAWINGS

FIG. 1 is a longitudinal cross-sectional view of the shock absorber of the invention;

FIG. 2 is a longitudinal cross-sectional view of the inner tube of the shock absorber of FIG. 1, rotated 90° with respect to its assembled position in FIG. 1;

DETAILED DESCRIPTION OF THE PREFERRED EMBODIMENT

The invention shock absorber, broadly considered, includes an inner tube 10, a piston assembly 12, an outer tube 14, and a bearing member 16.

Figure 3:
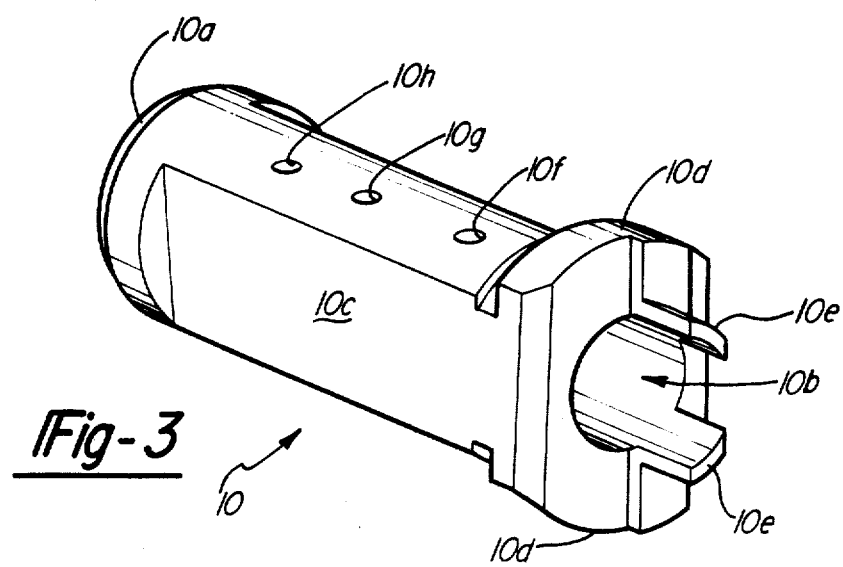
FIG. 3 is a perspective view of the inner tube of FIG. 2.
Figure 4:
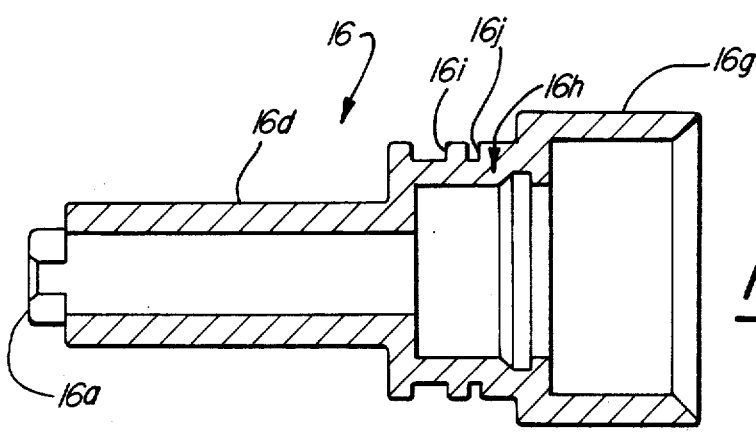
FIG. 4 is a longitudinal cross-sectional view of the bearing member of the shock absorber of FIG. 1.
Figure 5:
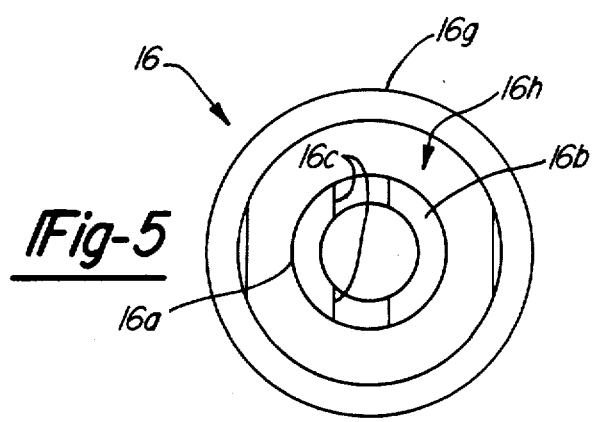
FIG. 5 is an end view of the bearing member of FIG. 4.

Inner tube 10 is formed of a suitable ferrous material and includes a closed rearward end 10a and an open forward end 10b. A pair of flats 10c are provided along opposite diametrical sides of inner tube 10 and arcuate flange portions 10d are provided adjacent the open forward end of the inner tube between flats 10c. A pair of arcuate fingers 10e project forwardly from the forward end of the inner tube and a plurality of ports 10f, 10g, and 10h are provided at longitudinally spaced locations along the side wall of the inner tube. The ports, in accordance with common practice, are exponentially spaced to provide a relatively constant resistive force to the motion over the total length of the deceleration of the moving part. Ports 10f, 10g, and 10h are positioned substantially angularly midway between flats 10c and fingers 10e are positioned substantially to one side of the longitudinal vertical center plane of the inner tube as viewed in FIG. 3.

Piston assembly 12 is formed of a suitable ferrous material and includes a piston rod 12a, a piston head 12b at the rearward end of the rod, and a button or pad 18 at the forward end of the rod secured to the rod forward end by a bolt 20. Piston head 12b is slidably received within inner tube 10 with the rearward end 12c of the piston head spaced from the closed rearward end 10a of inner tube 10 and with the piston rod 12a projecting forwardly out of the open forward end 10b of the inner tube. Piston head 12b further includes at least one axial passage 12d communicating with an annular groove 12e in the piston head, and the piston assembly further includes a piston ring 22 positioned in groove 12e in sliding engagement with the inner periphery of inner tube 10. Ring 22 is positioned in valving coaction with an annular passage 24 defined between the outer annular surface of a rib portion 12f of the piston head and the confronting inner surface of inner tube 10 as the piston assembly moves rearwardly within tube 10.

Outer tube 14 is formed of a suitable ferrous material and includes a rearward portion 14a and a forward portion 14b. Rearward portion 14a includes a plurality of longitudinally spaced circumferentially extending interior grooves 14c, 14d, and 14e formed in the inner periphery of the tube and respectively registering with ports 10f, 10g, and 10h. Grooves 14c, 14d, and 14e are skewed relative to the longitudinal axis of the shock absorber so that relative rotation of inner tube 10 and outer tube 14 selectively varies the magnitude of the registration between the ports and the corresponding grooves and thereby selectively varies the magnitude of the metering orifices cooperatively defined by the respective ports and grooves. Grooves 14c, 14d, and 14e preferably extend completely around the inner circumference of outer tube 14 to form a complete circular groove in each case. The outer surface of outer tube 14 is provided with threads 14f extending for substantially the entire length of the outer tube to facilitate mounting of the shock absorber in a threaded bracket plate such as seen at 26.

Inner tube 10 is rotatably positioned within outer tube 14 with an O-ring 28 positioned in a groove 14g in the rear inner periphery of tube 14 sealingly engaging the rear periphery of inner tube 10 and with the flange portions 10d of the inner tube seating against an annular shoulder 14h defined on the inner periphery of the outer tube 14 forwardly of the metering grooves.

Bearing member 16 is formed of a suitable ferrous material and extends into the open forward end of outer tube forward portion 14b. The rearward end of bearing member 16 defines a pair of arcuate fingers 16a, 16b which are complementary with respect to fingers 10e on inner tube 10 and which define arcuate openings 16c for intermeshing receipt of fingers 10e. Bearing member 16 defines an annular bearing portion 16d immediately forwardly of fingers 16a, 16b. Bearing portion 16d journals piston rod 12a at its inner periphery 16e and coacts at its outer periphery 16f with the confronting inner periphery 14i of outer tube 14 to define an annular accumulator chamber 28 in which a split annular accumulator pad 30 is positioned. The forward end of bearing member 16 defines an annular adjuster knob 16g positioned forwardly of the forward end of outer tube forward portion 14b and having the same outer diameter as forward portion 14b. Bearing member 16 also includes a seal portion 16h received within the open outer end of forward portion 14b of outer tube 14 and defining an annular groove 16i receiving a O-ring 32 for sealing engagement with the adjacent inner periphery of the outer tube and further defining a groove 16j for receipt of a lock ring 34 coacting with a confronting groove in outer tube 14 to preclude longitudinal displacement of the bearing member relative to the outer tube. A seal 36 and a wiper 38 are positioned in the annular space between piston rod 12a and the inner periphery of bearing member seal portion 16h, and a coil return spring 40 of conventional form is positioned between bearing member seal portion 16h and button 18.

In the assembled relation of the parts as seen in FIG. 1, flats 10c on the inner tube coact with the confronting inner surfaces of the outer tube to define a pair of diametrically opposed longitudinally extending passages 42. Passages 42 extend from a rearward location adjacent the rearmost groove 14e in the outer tube, extend forwardly therefrom to intersect grooves 14d and 14c, and finally communicate at their forward ends with accumulator chamber 28.

In use of the invention shock absorber, as the piston head 12b moves rearwardly within the inner tube 10 in response to impact of a moving object against button 18, piston ring 22 moves forwardly in groove 12e to assume a sealing posture relative to passage 24 to preclude forward escape of the fluid in the tube 10 rearwardly of the piston head so that the fluid rearwardly of the piston head is forced outwardly through ports 10f, 10g, and 10h, is thereafter routed around the corresponding grooves 14c, 14d, and 14e, and is thereafter routed by passages 42 to the accumulator chamber 28. The advancing piston head, in known manner, successively covers the exponentially spaced ports in the inner tube to provide a substantially constant resistive force to the motion over the total length of the deceleration. As the piston head thereafter moves forwardly under the urging of return spring 40, piston ring 22 moves rearwardly in groove 12e to uncover passage 24 and allow fluid from the accumulator chamber 28 to flow through passage 24, groove 12c, and axial bore 12d into the volume of the inner tube rearwardly of the piston head so as to fill the inner tube behind the forwardly moving piston head and ensure that the inner tube is filled upon the next impact loading. The extent of registration between ports 10f, 10 g and 10h and their corresponding grooves can be selectively varied by selective turning movement of adjuster knob 16g. Turning movement of knob 16g, by virtue of the skewed posture of the grooves, varies the magnitude of the registration as between the ports and the grooves and thereby varies the magnitude of the resistive force offered to the impacting object.

The invention shock absorber construction allows the construction of a shock absorber of extremely small dimensions yet offering high resistance to impact loading and precise control of the magnitude of the resistance offered to the impact loading. For example, a commercially practical embodiment of the invention shock absorber has an external diameter of one inch and an overall length of approximately four and one-half inches. A shock absorber of this size and embodying the invention construction is capable of generating approximately 600 pounds of resistive force to the impacting load and provides precise control of the exact magnitude of the resistance offered to the impacting load. The invention shock absorber is simple and compact in design and operation and is therefor relatively inexpensive to produce and yet is imminently suitable for premium shock absorber applications wherein high shock absorber reliability and precise shock absorber control are imperative.

Whereas a preferred embodiment of the invention has been illustrated and described in detail, it will be apparent that various changes may be made in the disclosed embodiment without departing from the scope or spirit of the invention.

I claim:

1. In a shock absorber of the type including an inner tube closed at closed at its rearward end and open at its forward end; a piston rod and piston head assembly slidably received in the inner tube with the rearward end of the piston head spaced from the closed rearward end of the inner tube and the piston rod projecting forwardly out of the open forward end of the inner tube for impact by a moving object; an outer tube surrounding the inner tube; a cushioning fluid substantially filling the shock absorber; metering means in the inner tube coating with metering means in the outer tube to define a plurality of metering orifices; and adjusting means providing relative movement between the inner and outer tubes and operative in response to such relative movement to selectively vary the respective relative positions of the metering means in the inner tube relative to the coacting respective metering means in the outer tube to thereby vary the size of the metering orifices and thereby selectively vary the impact resistance generated by the movement of the cushioning fluid through the metering orifices in response to impacting movement of the piston assembly toward the closed rearward end of the inner tube; the improvement wherein:

(A) an annular accumulator chamber is provided in said shock absorber radially outwardly of said piston assembly at a longitudinal location forwardly of said metering orifices; and (B) means are provided for routing cushioning fluid from said metering orifices axially forwardly between said inner and outer tubes to said annular accumulator chamber.

2. A shock absorber according to claim 1 wherein:

(C) said outer tube comprises the outer casing of said shock absorber and extends to a location forwardly of said inner tube; and (D) said accumulator chamber is defined forwardly of said inner tube between the forward extension of said outer tube and said piston assembly.

3. A shock absorber according to claim 1 wherein:

(C) said coacting means in said tubes comprises
 (1) a plurality of ports in said inner tube at longitudinally spaced locations along its side wall, and
 (2) a plurality of longitudinally spaced interior grooves in said outer tube respectively registering with said ports in said side wall of said inner tube and skewed with respect to the longitudinal axis of the shock absorber; and (D) said adjusting means comprises means providing relative rotation between said tubes to selectively vary the magnitude of the registration between said ports and said grooves.

4. A shock absorber according to claim 1 wherein:

(C) said routing means comprises at least one longitudinal passage defined between said tubes and extending forwardly from a location adjacent the rearmost metering orifice to said accumulator chamber.

5. A shock absorber according to claim 4 wherein:

(D) said coacting means in said tubes comprises
 (1) a plurality of ports in said inner tube at longitudinally spaced locations along its side wall, and
 (2) a plurality of longitudinally spaced interior grooves in said outer tube respectively registering with said ports in said side wall of said inner tube and skewed with respect to the longitudinal axis of the shock absorber; and (E) said adjusting means comprises means providing relative rotation between said tubes to selectively vary the magnitude of the registration between said ports and said grooves.

6. A shock absorber according to claim 5 wherein:

(F) said longiudinal passage intersects each of said grooves as it extends forwardly to said accumulator chamber.

7. A shock absorber according to claim 6 wherein:

(G) said ports lie generally along a straight line parallel to said axis; and (H) said passage is angularly displaced relative to said ports.

8. In a shock absorber of the type including an inner tube closed at closed at its rearward end and open at its forward end; a piston rod and piston head assembly slidably received in the inner tube with the rearward end of the piston head spaced from the closed rearward end of the inner tube and the piston rod projecting forwardly out of the open forward end of the inner tube for impact by a moving object; an outer tube surrounding the inner tube; a cushioning fluid substantially filling the shock absorber; means in the inner an outer tubes cooperating to define a plurality of metering orifices; and adjusting means for providing relative movement between the tubes to selectively vary the size of the metering orifices and thereby selectively vary the impact resistance generated by the movement of the cushioning fluid through the metering rifices in response to impacting movement of the piston assembly toward the closed rearward end of the inner tube; the improvement wherein:

(A) an annular acculumator chamber is provided in said shock absorber radially outwardly of said piston assembly at a longitudinal location forwardly of said metering orifices;

(B) means are provided for routing cushioning fluid from said orifices axially forwardly between said tubes to said annular accumulator chamber;

(C) said coacting means in said tubes comprising
  (1) a plurality of ports in said inner tube at longitudinally spaced locations along its side wall and defined generally along a straight line parallel to said axis, and
  (2) a plurality of longitudinally spaced interior grooves in said outer tube respectively registering with said ports in said side wall of said inner tube and skewed with respect to the longitudinal axis of the shock absorber;

(D) said adjusting means comprising means providing relative rotation between said tubes to selectively vary the magnitude of the registration between the said ports and said grooves;

(E) said routing means comprising at least one longitudinal passage defined between said tubes, extending forwardly from a location adjacent the rearmost metering orifice to said accumulator chamber, intersecting each of said grooves as it extends forwardly to said accumulator chamber, being angularly displaced relative to said ports, and being defined in part by a longiudinally extending flat formed on the outer surface of said inner tube.

9. A shock absorber according to claim 8 wherein:
(F) said inner tube is flatted at diametrically opposed locations on its outer surface to provide two of said longitudinal passages.

10. A shock absorber according to claim 9 wherein:
(G) said straight line lies substantially angularly midway between said diametrically opposed flats.

11. In a shock absorber of the type including an inner tube closed at its rearward end and open at its forward end; a piston rod and piston head assembly slidably received in the inner tube with the rearward end of the piston head spaced from the closed rearward end of the inner tube and the piston rod projecting forwardly out of the open forward end of the inner tube for impact by a moving object; an outer tube surrounding the inner tube; a cushioning fluid substantially filling the shock absorber; means in the inner an outer tubes cooperating to define a plurality of metering orifices; an adjusting means for providing relative movement between the tubes to selectively vary the size of the metering orifices and thereby selectively vary the impact resistance generated by the movement of the cushioning fluid through the metering orifices in response to impacting movement of the piston assembly toward the closed rearward end of the inner tube; the improvement wherein:

(A) an annular acculumator chamber is provided in said shock absorber radially outwardly of said piston assembly at a longitudinal location forwardly of said metering orifices;

(B) means are provided for routing cushioning fluid from said orifices axially forwardly between said tubes to said annular accumulator chamber;

(C) said outer tube comprising the outer casing of said shock absorber and extends to a location forwardly of said inner tube; and (D) said adjusting means comprises an adjuster member extending into the open forward end of said outer tube and engaging at its rearward end with the forward end of said inner tube and presenting an adjustment knob at its forward end positioned forwardly of the forward end of said outer tube.

12. A shock absorber according to claim 11 wherein:
(E) said adjustment member is annular;
(F) said adjutment knob is defined by the forward annular portion of said adjustment member; and
(G) said adjustment member further defines an annular bearing portion between its rearward end and said adjustment knob journalling said piston rod at its inner periphery and defining at its outer periphery the inner periphery of said annular accumulator chamber.

13. A shock absorber comprising:
(A) a piston assembly including a piston rod and a piston head;
(B) an inner tube
  (1) having a closed rearward end and an open forward end,
  (2) slidably receiving said piston assembly with the rearward end of said piston held spaced from said closed rearward end of said inner tube and said piston rod projecting forwardly out of said open forward end of said inner tube,
  (3) having a plurality of longitudinally aligned ports formed at longitudinally spaced locations along its side wall, and
  (4) having at least one longitudinally extending flat formed in its outer surface at a location angularly spaced from said ports;
(C) an outer tube
  (1) comprising the outer casing of said shock absorber,
  (2) surrounding said inner tube and mounting said inner tube for rotation therewithin,
  (3) having a plurality of longitudinally spaced interior grooves respectively registering with said ports and said inner tube and skewed with respect to the longitudinal axis of said shock absorber, and
  (4) extending to a location forwardly of the forward end of said inner tube; and
(D) an annular adjuster and bearing member
  (1) received in the open forward end of said outer tube,
  (2) having means at its rearward end engaging the forward end of said inner tube to rotate said inner tube in response to rotation of said adjuster and bearing member,
  (3) defining an annular adjuster knob at its forward end positioned forwardly of the forward end of said outer tube, and (4) defining an annular bearing portion between its rearward end and said adjuster knob journalling said piston rod at its inner periphery and coacting at its outer periphery with the confronting spaced inner periphery of said outer tube to define an annular accumulator chamber communicatng at its rearward end with the forward end of the longitudinal passage defined between said flat on said inner tube and the confronting inner surface of said outer tube.

* * * * *

UNITED STATES PATENT AND TRADEMARK OFFICE
CERTIFICATE OF CORRECTION

PATENT NO. : 4,690,255

DATED : September 1, 1987

INVENTOR(S) : Robert J. Heideman

It is certified that error appears in the above-identified patent and that said Letters Patent is hereby corrected as shown below:

Column 5, line 63, "coating" should be --coacting--.

Column 7, line 12, "rifices" should be --orifices--.

Column 7, line 44, "longiudinally" should be --longitudinally--.

Column 8, line 22, "adjutment" should be --adjustment--.

Signed and Sealed this

Fourteenth Day of June, 1988

Attest:

DONALD J. QUIGG

*Attesting Officer*      *Commissioner of Patents and Trademarks*